(12) United States Patent
Wakino (10) Patent No.: US 10,475,187 B2
(45) Date of Patent: Nov. 12, 2019

(54) APPARATUS AND METHOD FOR DIVIDING IMAGE INTO REGIONS

(71) Applicant: CANON KABUSHIKI KAISHA, Tokyo (JP)

(72) Inventor: Shiori Wakino, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 27 days.

(21) Appl. No.: 15/469,217

(22) Filed: Mar. 24, 2017

(65) Prior Publication Data

US 2017/0287138 A1    Oct. 5, 2017

(30) Foreign Application Priority Data

Mar. 30, 2016 (JP) .................. 2016-069151

(51) Int. Cl.
*G06K 9/34* (2006.01)
*G06T 7/11* (2017.01)

(52) U.S. Cl.
CPC ...... *G06T 7/11* (2017.01); *G06T 2207/20021* (2013.01)

(58) Field of Classification Search
CPC .................. G06T 2207/20021; G06T 7/11
See application file for complete search history.

(56) References Cited

U.S. PATENT DOCUMENTS

| | | | | |
|---|---|---|---|---|
| 7,742,656 B2* | 6/2010 | Lee | ........................... | G06T 3/00 348/143 |
| 9,020,296 B2* | 4/2015 | Nagamasa | ................ | G06T 5/00 382/276 |
| 9,679,388 B2* | 6/2017 | Hashiguchi | ............... | G06T 7/11 |
| 2005/0163398 A1* | 7/2005 | Ioka | ......................... | G06T 5/50 382/284 |
| 2010/0329556 A1* | 12/2010 | Mitarai | .................... | G06K 9/38 382/170 |
| 2011/0211749 A1* | 9/2011 | Tan | .......................... | G06T 7/11 382/154 |
| 2012/0213439 A1* | 8/2012 | Kawano | ............ | H04N 1/40075 382/173 |

(Continued)

FOREIGN PATENT DOCUMENTS

JP    8-30787 A    2/1996

OTHER PUBLICATIONS

Radhakrishna Achanta, et al.; "SLIC Superpixels Compared to State-of-the-Art Superpixel Methods;" IEEE Transactions on Pattern Analysis and Machine Intelligence, vol. 34, No. 11, pp. 2274-2282, Nov. 2012.

*Primary Examiner* — Bhavesh M Mehta
*Assistant Examiner* — Ian L Lemieux
(74) *Attorney, Agent, or Firm* — Canon U.S.A., Inc. IP Division (57) ABSTRACT

An image processing apparatus includes a dividing unit configured to divide an image into a plurality of regions based on an attribute of a pixel, the image having an image coordinate system set therein; a converting unit configured to set a region coordinate system for each of the regions obtained by the dividing unit and to convert coordinate values of a pixel in the image on the image coordinate system into coordinate values on the region coordinate system set for a region to which the pixel belongs; and a calculating unit configured to calculate a feature amount of the region by using the converted coordinate values.

21 Claims, 7 Drawing Sheets

(56) References Cited

U.S. PATENT DOCUMENTS

| | | | |
|---|---|---|---|
| 2014/0321765 A1* | 10/2014 | Iwamoto | H04N 19/54 |
| | | | 382/243 |
| 2015/0350579 A1* | 12/2015 | Shiozaki | G06T 7/11 |
| | | | 348/246 |
| 2016/0125569 A1* | 5/2016 | Wakino | G06T 1/60 |
| | | | 382/305 |

* cited by examiner

APPARATUS AND METHOD FOR DIVIDING IMAGE INTO REGIONS

BACKGROUND OF THE INVENTION

Field of the Invention

The aspect of the embodiments relates to an apparatus and a method for dividing an image into regions.

Description of the Related Art

Conventionally, as preprocessing of image processing such as object recognition, a segmentation technique is being used in which an image is divided into a plurality of regions so that the attributes such as the color, the pattern, and the brightness of each region become homogeneous. These divided regions can thereafter be subjected to coding processing or recognition processing on a region by region basis, and thus the processing amount can be reduced as compared to a case in which an image is processed on a pixel by pixel basis. In recent years, there are increasing cases in which a high-resolution image is subjected to image processing in an embedded device, and it is contemplated that as the processing can be carried out on a region by region basis after an image is divided into regions, complex processing can be carried out on a high-resolution image in real time even in an embedded device.

As one technique in the segmentation processing, Japanese Patent Laid-Open No. 8-30787 discloses a clustering technique that uses k-means clustering. In the technique disclosed in Japanese Patent Laid-Open No. 8-30787, an image is divided into a plurality of blocks, and the segmentation processing is carried out on a block by block basis, in order to carry out the segmentation processing with a small memory and a short operation time.

In addition, as a technique that is based on the k-means clustering, Radhakrishna Achanta, et al., "SLIC Superpixels Compared to State-of-the-Art Superpixel Methods," IEEE Transactions on Pattern Analysis and Machine Intelligence, vol. 34, No. 11, pp. 2274-2282, November 2012 discloses a technique called SLIC (Simple Linear Iterative Clustering), in which an image is divided into small and perceptually meaningful regions called superpixels. In the SLIC technique, each of the pixels is clustered to any one of a plurality of representative points disposed in a lattice pattern on an image, and the representative points are updated after the segmentation processing. The difference between the SLIC technique and the k-means clustering lies in that the coordinate space in which pixels are clustered to representative points is limited to a predetermined range in the SLIC technique. The small regions divided through the SLIC technique have relatively equal shapes, and the number of the regions is stable.

Furthermore, a technique for recognizing an object in clustered small regions has also been developed. Such a technique is applied to the determination of a scene in a captured image, in which the feature amount of a small region is extracted, and the extracted feature amount is analyzed to recognize the object.

The feature amount of the clustered small region is obtained through a cumulative operation on data extracted for each of the pixels within the small region, and the calculated feature amount is stored into a memory. When the feature amount is stored in a memory, the memory size of the memory needs to have a data width capable of storing the maximum value of the feature amount. The positional coordinates of a pixel increase as its distance from the origin of the image increases. Therefore, when the feature amount is data to be calculated with the use of the positional coordinates of the pixels, the amount of data (the number of digits) of the feature amount increases as the size of the image to be processed increases, and the size of the memory for storing the feature amount needs to be increased. In addition, the time it takes to read and write the data from and into the memory increases, which leads to a decrease in the processing performance.

SUMMARY OF THE INVENTION

An aspect of the embodiments provides an image processing apparatus that includes a dividing unit configured to divide an image into a plurality of regions based on an attribute of a pixel, the image having an image coordinate system set therein; a converting unit configured to set a region coordinate system for each of the regions obtained by the dividing unit and to convert coordinate values of a pixel in the image on the image coordinate system into coordinate values on the region coordinate system set for a region to which the pixel belongs; and a calculating unit configured to calculate a feature amount of the region by using the converted coordinate values.

Further features of the disclosure will become apparent from the following description of exemplary embodiments with reference to the attached drawings.

DESCRIPTION OF THE EMBODIMENTS

Hereinafter, exemplary embodiments of the disclosure will be described in detail with reference to the appended drawings. It is to be noted that the exemplary embodiments described hereinafter are merely examples of implementation modes of the disclosure and are to be modified or changed as appropriate in accordance with the configurations and various conditions of an apparatus to which the disclosure is applied. Furthermore, the disclosure is not limited to the exemplary embodiments described hereinafter.

In the present exemplary embodiment, an image processing apparatus that, with an image serving as a target to be processed, carries out segmentation processing of dividing the image into a plurality of small local regions so that the attributes such as the color, the pattern, and the brightness of each pixel become homogeneous and carries out recognition processing and so forth on a small region by small region basis will be described. In the recognition processing, the image processing apparatus calculates the feature amount of each divided small region (region feature amount). The region feature amount includes an image quality feature amount that indicates the feature pertaining to the image quality of an image and a geometric feature amount that indicates the geometric feature of an image. The image quality feature amount includes a color average or the like of R, G, and B in a small region, and the geometric feature amount includes the area of a small region (hereinafter, referred to as "0th order moment"), the center of gravity of a small region (hereinafter, referred to as "1st order moment"), the dispersion of a small region (hereinafter, referred to as "2nd order moment"), and so on.

In the present exemplary embodiment, the image processing apparatus employs, as a technique in the segmentation processing, the SLIC technique in which pixels are clustered by using five-dimensional information on the color space (R,G,B) and the coordinate space (x,y). Although the color space of RGB (R,G,B) is used in the description of the present exemplary embodiment, the color space may also be CIELAB (L*,a*,b*), YCC (Y,Cb,Cr), or the like. In the segmentation processing, representative points, which serve as the centers of the clusters, are disposed first in a lattice pattern on an image, and unique numbers, such as 0, 1, 2, . . . , are assigned to the respective representative points (hereinafter, referred to as "region labels"). Then, each of the pixels is clustered to any one of the plurality of representative points that are disposed in a lattice pattern, and the region labels of the representative points are assigned to the respective pixels. Thus, the image is divided into a plurality of small regions (hereinafter, also referred to simply as "regions"). At this point, the coordinate space in which the pixels are clustered to the representative points is limited to a predetermined range. After the segmentation processing, the representative points are updated in accordance with the respective divided small regions.

Figure 1:
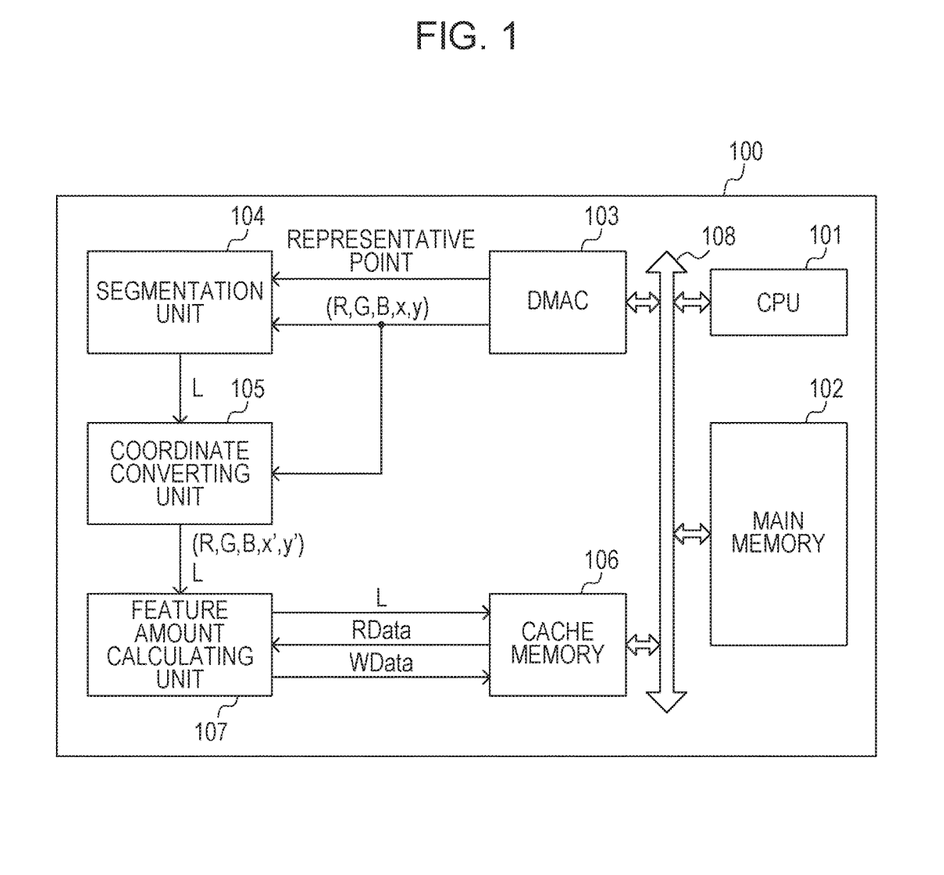
FIG. 1 is a hardware configuration diagram of an image processing apparatus.

FIG. 1 is a hardware configuration diagram of an image processing apparatus 100 according to the present exemplary embodiment. The image processing apparatus 100 carries out segmentation processing of dividing an image into a plurality of small local regions under a predetermined constraint condition and calculates the feature amount of each divided small region. In the present exemplary embodiment, a case in which the image processing apparatus 100 divides an image into a plurality of blocks and carries out processing (segmentation processing and feature amount calculation processing) on a block by block basis will be described.

The image processing apparatus 100 may be an embedded computer that functions as a part of an embedded device including an imaging apparatus such as a digital camera or may be constituted by a personal computer (PC).

The image processing apparatus 100 includes a central processing unit (CPU) 101, a main memory 102, a direct memory access controller (DMAC) 103, a segmentation unit 104, a coordinate converting unit 105, a cache memory 106, a feature amount calculating unit 107, and a system bus 108.

The CPU 101 controls the general operation of the image processing apparatus 100 and controls the constituting units (102, 103, and 106) via the system bus 108. The main memory 102 stores an image to be processed that has been acquired through a device that acquires an image, such as a sensor or a network interface (not illustrated). In addition, the main memory 102 stores a parameter necessary for the segmentation processing and information on the representative points that represent the respective small regions. Furthermore, the main memory 102 functions as a work memory of the CPU 101 and is used as an area for storing a processing result of the CPU 101.

Figure 2:
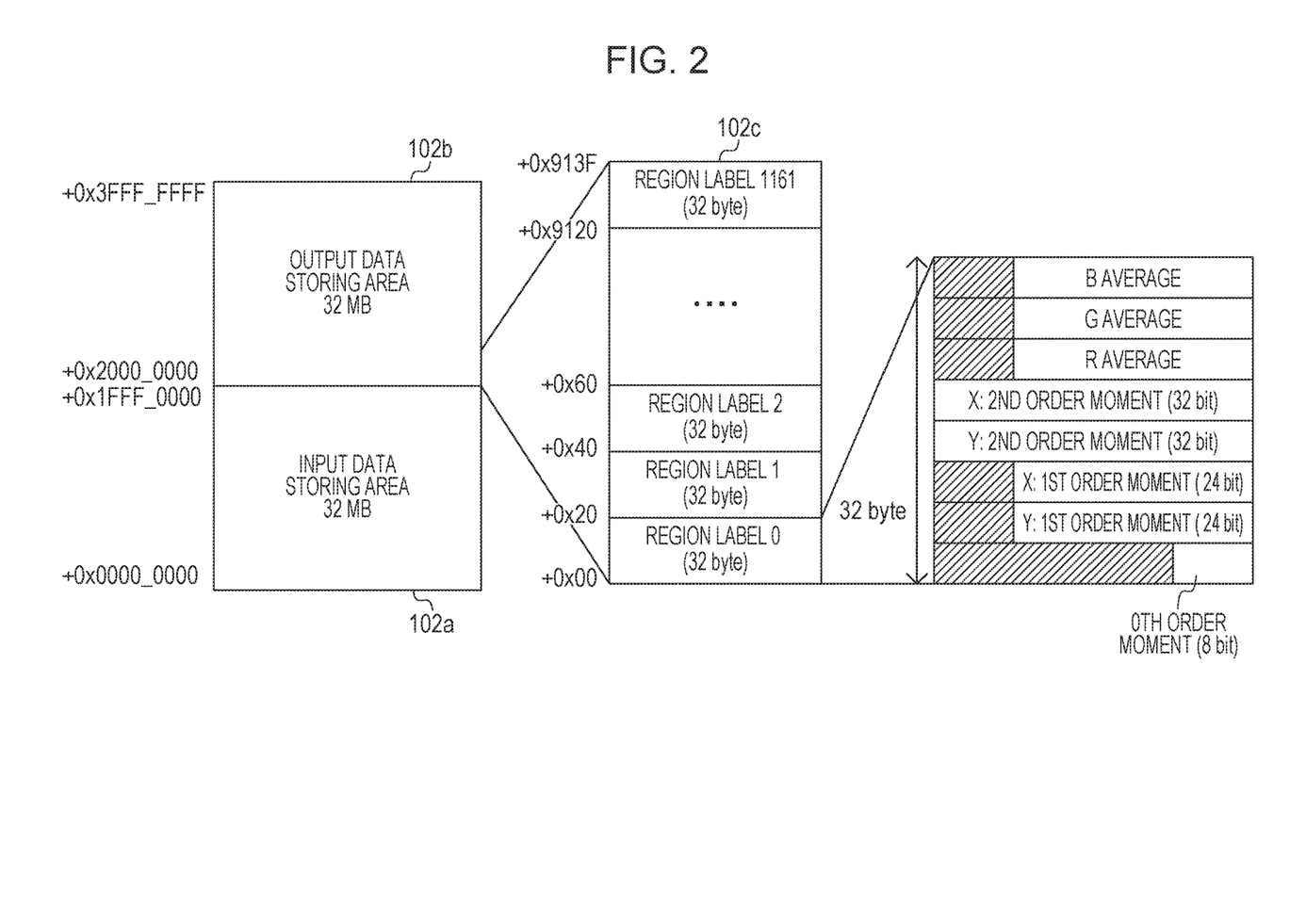
FIG. 2 is a memory image of a main memory.

FIG. 2 is a memory image of the main memory 102. The main memory 102 includes an input data storing area 102a that stores input data and an output data storing area 102b that stores output data. The input data storing area 102a stores an image (R,G,B) to be processed, a parameter to be used by the segmentation unit 104 in the segmentation processing, which will be described later, and information on the representative points. The output data storing area 102b stores (retains) information pertaining to a region label L output by the segmentation unit 104 and a calculation result of the feature amount calculating unit 107.

The output data storing area 102b includes a feature amount storing area 102c that stores the region feature amount of each small region. The feature amount storing area 102c stores the region feature amounts of the respective small regions in order of the region labels L. The region feature amount is 32-byte data that includes the image quality feature amount (color average of R, G, and B) and the geometric feature amount (0th order moment, 1st order moment, and 2nd order moment). An example of calculating the geometric feature amount is illustrated below.

0th order moment $$n \tag{1}$$

1st order moment $$\frac{1}{n}\sum_{i=1}^{n} x(i), \frac{1}{n}\sum_{i=1}^{n} y(i) \tag{2}$$

2nd order moment $$\frac{1}{n}\sum_{i=1}^{n} x(i)^2 - \left(\frac{1}{n}\sum_{i=1}^{n} x(i)\right)^2, \frac{1}{n}\sum_{i=1}^{n} y(i)^2 - \left(\frac{1}{n}\sum_{i=1}^{n} y(i)\right)^2 \tag{3}$$

In the above, n indicates the number of pixels to which an identical region label L is assigned. In addition, (x(i),y(i)) represents the positional coordinates of an ith pixel among n pixels to which an identical region label L has been assigned. The 1st order moment and the 2nd order moment are calculated with the use of a cumulative operation value, which is a calculation result of a cumulative operation carried out on a pixel by pixel basis (hereinafter, also referred to as "feature amount data"). The feature amount calculating unit 107, which will be described later, calculates the cumulative operation value for each small region on a block by block basis, processes the cumulative operation value after processing on one image (processing on all of the blocks) has been finished, and calculates the final geometric feature amount for each small region.

In the present exemplary embodiment, the positional coordinates of each pixel are limited to 8 bits through the coordinate conversion processing by the coordinate converting unit 105, which will be described later. Therefore, the data width of the 0th order moment is limited to 8 bits, the data width of the 1st order moment is limited to 24 bits, and the data width of the 2nd order moment is limited to 32 bits.

Referring back to FIG. 1, the DMAC 103 is a direct memory access controller that transfers data between the main memory 102 and the segmentation unit 104 and coordinate converting unit 105 and is controlled by the CPU 101. The CPU 101 sets, in the DMAC 103, the address from which the data is transferred, the transfer size, the addressing pattern, and the address to which the data is transferred, and upon the CPU 101 providing a trigger for stating the data transfer, the DMAC 103 transfers the data in accordance with the setting. Upon having transferred the data, the DMAC 103 notifies the CPU 101 of the completion.

In a case in which the data is set to be transferred to the segmentation unit 104, the DMAC 103 reads out the parameter necessary for the segmentation processing and information on the representative points from the input data storing area 102a of the main memory 102 and transfers the data to the segmentation unit 104. At this point, the DMAC 103 reads out, as the parameter necessary for the segmentation processing, the predetermined constraint condition of the segmentation processing from the main memory 102 and transfers the data to the segmentation unit 104. In addition, the DMAC 103 reads out, as the information on the representative points, information on the representative points within a block to be processed and the representative points surrounding the block to be processed from the main memory 102 and transfers the information to the segmentation unit 104.

Furthermore, in a case in which the data is set to be transferred to the segmentation unit 104 and the coordinate converting unit 105, the DMAC 103 reads out the pixel data of a block to be processed in a raster order from the input data storing area 102a of the main memory 102 and transfers the pixel data to the segmentation unit 104 and the coordinate converting unit 105. At this point, the DMAC 103 can calculate the positional coordinates (x,y) of a pixel from the address from which the image has been transferred and transfers the extended pixel data (R,G,B,x,y) to the segmentation unit 104 and the coordinate converting unit 105.

In addition, in a case in which the data is set to be transferred from the segmentation unit 104 to the main memory 102, the DMAC 103 transfers the region label L output from the segmentation unit 104 to the main memory 102.

The segmentation unit 104 divides an image to be processed into a plurality of regions by clustering each of the pixels in the image to any one of the representative points, by using the information on the representative points and the pixel data (R,G,B,x,y) transferred from the DMAC 103, labels respective regions, and outputs the region label L. At this point, the segmentation unit 104 divides the image into a plurality of small local regions and labels the small regions in accordance with the predetermined constraint condition of the segmentation processing transferred from the DMAC 103.

The above-described predetermined constraint condition includes a step size and a search range. The step size is an interval between the initial representative points disposed in a lattice pattern on an image, and the search range is the range in which the representative points are searched for when the pixels are clustered. These constraint conditions are provided via the DMAC 103 under the control of the CPU 101. The segmentation unit 104 may be configured to operate as dedicated hardware, or the function of the segmentation unit 104 may be implemented as the CPU 101 executes a program.

Figure 3:
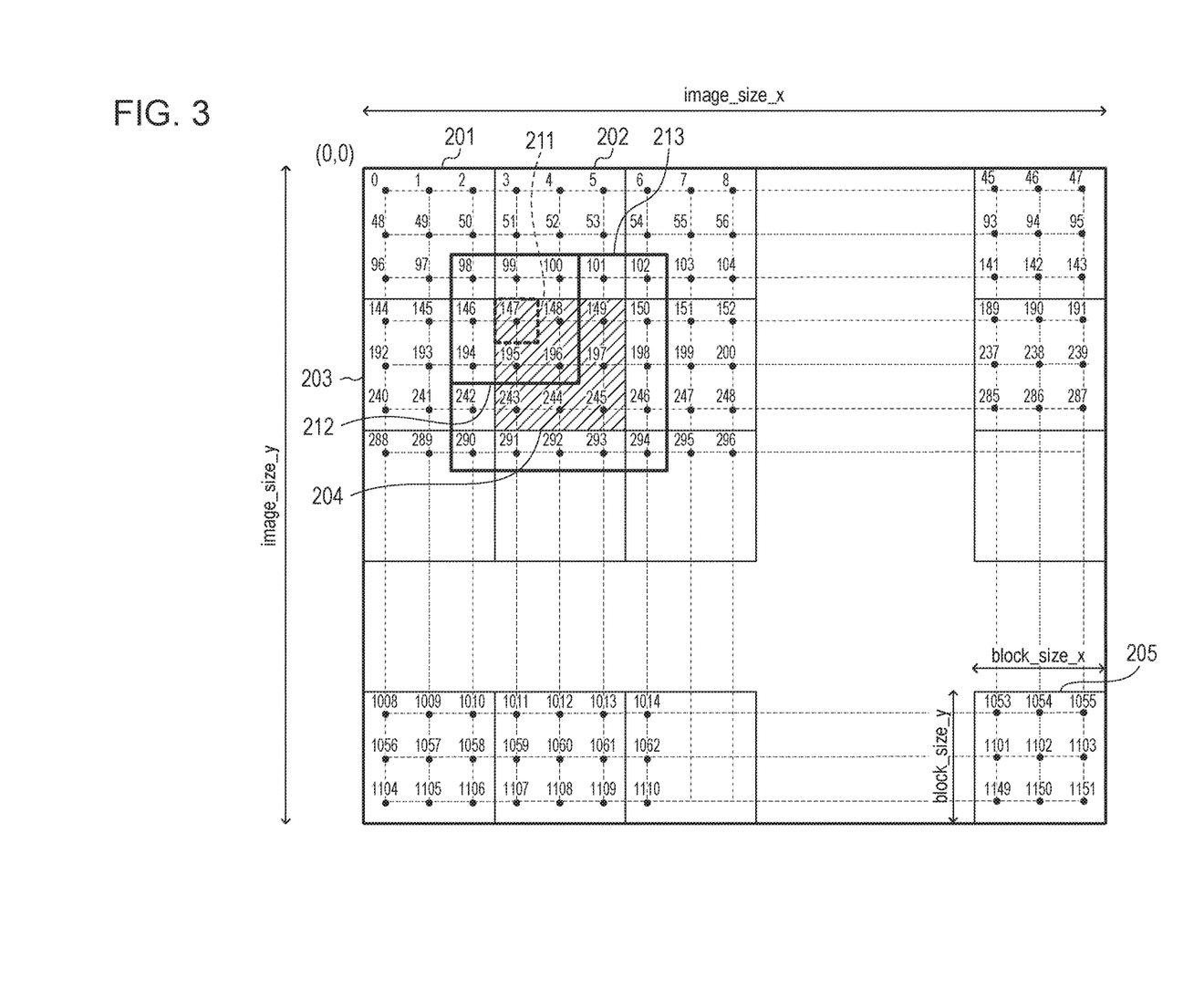
FIG. 3 is an illustration for describing an image to be processed in an image processing apparatus.

FIG. 3 is an illustration for describing an image to be processed. The size (image_size) of the image to be processed is 2040 pixels high (y-direction) by 4080 pixels wide (x-direction), and the pixel data is constituted by 24-bit color data (R,G,B). In the image coordinate system set in this image, the positional coordinates of a pixel increase such that the value of X increases in the horizontal direction and the value of Y increases in the vertical direction from the origin (x,y)=(0,0) lying at the upper left coordinates. The image is divided into a plurality of blocks (201 through 205, etc.), and the segmentation unit 104 carries out the segmentation processing on a block by block basis. The size (block_size) of each block is 255 pixels high by 255 pixels wide.

In the segmentation processing, the segmentation unit 104 first disposes the representative points in a lattice pattern across the entire image, as described above. The interval of this lattice is the step size. In the present exemplary embodiment, the step size is 85 pixels. After the segmentation processing, the representative points are updated. Through the segmentation processing, each of the pixels is clustered to any one of the plurality of representative points located within a predetermined range in which the representative point to which the pixel of interest is located closest in the initial state is at the center, and any one of the region labels L of the representative points is assigned to that pixel. This predetermined range is the search range.

In this manner, the segmentation unit 104 limits the search range that indicates the range in which the representative point to which a pixel is clustered is searched for to a predetermined range. By limiting the coordinate space in which a pixel is clustered to a specific representative point to a predetermined range, the stable segmentation processing in which the sizes of the small regions are substantially equal to one another can be carried out.

When the search range is one step size, each of the pixels is assigned to any one of the total of nine region labels L of the representative point to which the pixel of interest is located closest in the initial state and the surrounding eight representative points located within the range of one step size from the stated representative point lying as the center. Specifically, when the pixel of interest is the pixel that is within a range 211 and that has the representative point with L=147 as the closest representative point, the pixel of interest is labeled as any one of the region labels L=98, 99, 100, 146, 147, 148, 194, 195, and 196 of the representative points within a range 212. Therefore, in order to process all of the pixels within the block 204, information on the representative points within the block 204 and on the representative points surrounding the block 204, or in other words, information on the total of 25 representative points in a range 213 is needed.

After receiving the parameter necessary for the segmentation processing and the information on the representative points from the DMAC 103, the segmentation unit 104 receives the pixel data in a raster order and starts the segmentation processing. The segmentation unit 104 determines which region label L of the representative point is assigned to each of the pixels and passes the region label L, which is the determination result, to the coordinate converting unit 105. The segmentation unit 104 may also pass the region label L to the DMAC 103 and store the region label L into the main memory 102.

Figure 4:
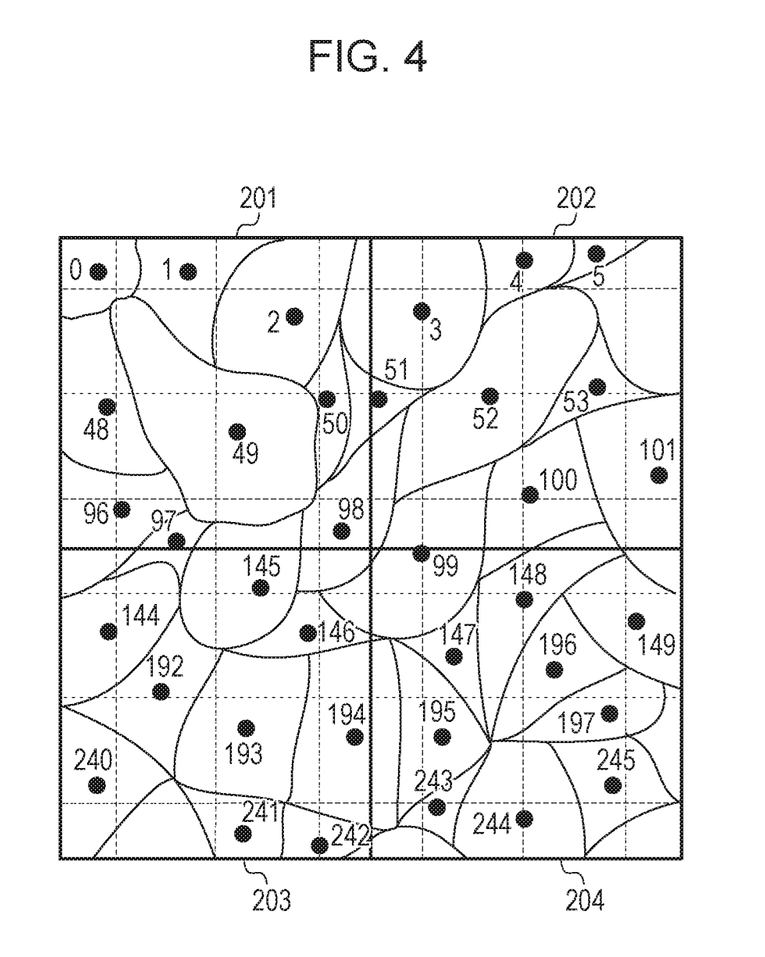
FIG. 4 illustrates an exemplary result of segmentation processing.

An exemplary result of the segmentation processing is illustrated in FIG. 4. FIG. 4 illustrates only the blocks 201 through 204 illustrated in FIG. 3. An identical region label L may be assigned to pixels across a plurality of blocks at a boundary portion of the blocks. In FIG. 4, the region label L=51 is assigned to the two blocks 201 and 202, and the region label L=98 is assigned to the four blocks 201 through 204.

Referring back to FIG. 1, the coordinate converting unit 105 receives the pixel data (R,G,B,x,y) and the region label L and carries out the coordinate conversion of the positional coordinates (x,y) in accordance with the region label L. Specifically, the coordinate converting unit 105 determines a region coordinate system unique to a given small region on the basis of the region label L and converts the positional coordinates (x,y) on the image coordinate system to the coordinate values (x',y') on the determined region coordinate system. In other words, the coordinate converting unit 105 converts the coordinate values of a plurality of pixels to which an identical region label L has been assigned to the coordinate values on an identical coordinate system (coordinate system unique to that region).

Figure 5:
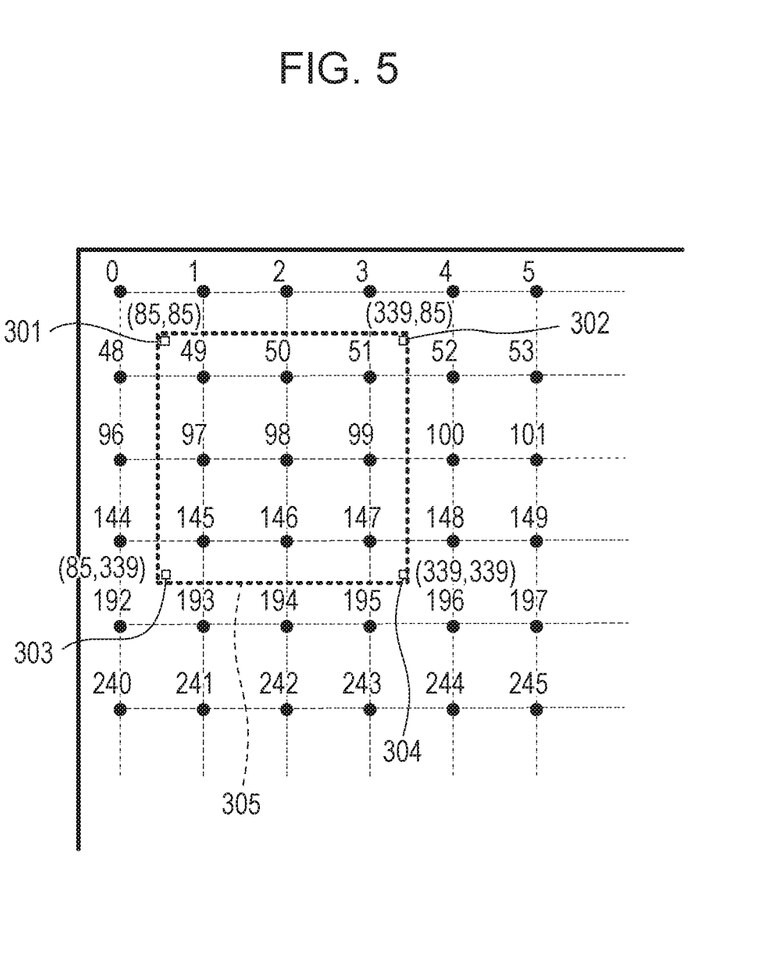
FIG. 5 is an illustration for describing a method for determining a coordinate system corresponding to a small region.

FIG. 5 is an illustration for describing a coordinate system unique to each of the small regions. As described above, any one of the region labels L of the plurality of representative points located within the search range in which the representative point to which the pixel of interest is located closest in the initial state is at the center is assigned to the pixel of interest. In the present exemplary embodiment, the image width (image_size_x) in the X-direction is 4080 pixels, and the step size is 85 pixels. Thus, 48 representative points are disposed in the X-direction. In addition, the image height (image_size_y) in the Y-direction is 2040 pixels, and thus 24 representative points are disposed in the Y-direction.

When the representative points are disposed in this manner, the initial coordinates $(X\text{ini}(L), Y\text{ini}(L))$ of the representative point with the region label L can be expressed through the following expressions.

$$X\text{ini}(L) = 42 + 85(L\% 48),$$

$$Y\text{ini}(L) = 42 + 85(L - L\% 48)/48 \qquad (4)$$

Then, the region label L (closest representative point number N) to which the pixel (x,y) is located closest in the initial state can be expressed by the following expression.

$$N = 48(y - y\% 85)/85 + (x - x\% 85)/85 \qquad (5)$$

When the pixel 301 (x,y)=(85,85) in FIG. 5 is the pixel of interest, the closest representative point number is N=49, and any one of the region labels L=0, 1, 2, 48, 49, 50, 96, 97, and 98 is assigned to the pixel 301. In a similar manner, when the pixel 302 (x,y)=(339,85) is the pixel of interest, the closest representative point number is N=51, and any one of the region labels L=2, 3, 4, 50, 51, 52, 98, 99, and 100 is assigned to the pixel 302.

In addition, when the pixel 303 (x,y)=(85,339) is the pixel of interest, the closest representative point number is N=145, and any one of the region labels L=96, 97, 98, 144, 145, 146, 192, 193, and 194 is assigned to the pixel 303. Furthermore, when the pixel 304 (x,y)=(339,339) is the pixel of interest, the closest representative point number is N=147, and any one of the region labels L=98, 99, 100, 146, 147, 148, 194, 195, and 196 is assigned to the pixel 304.

In other words, from the viewpoint of the region label L, it can be said that pixels to which a specific region label L can be assigned are located at the coordinates closest to any one of the representative points located within a search range for the initial coordinates of the representative point with that region label L. For example, pixels to which the region label L=98 can be assigned are located within a range 305 in which these pixels are located closest to any one of the representative points 49, 50, 51, 97, 99, 145, 146, and 147 located within the search range for the initial coordinates of the representative point with the region label L=98.

As described above, the representative point number N to which the pixel (x,y) is located closest in the initial state is expressed by the expression (5) above. Therefore, the positional coordinates (x,y) of a pixel of which the closest representative point number is N=49 are within a range of 85≤x<170 and 85≤y<170. Thus, the upper left coordinates of the range 305 are (85,85), and the pixel 301 is the upper left pixel in the range 305. In addition, the positional coordinates (x,y) of a pixel of which the closest representative point number is N=51 are within the range of 225≤x<340 and 85≤y<170. Thus, the upper right coordinates of the range 305 are (339,85), and the pixel 302 is the upper right pixel in the range 305.

In a similar manner, the positional coordinates (x,y) of a pixel of which the closest representative point number is N=145 are within the range of 85≤x<170 and 225≤y<340. Thus, the lower left coordinates of the range 305 are (85,339), and the pixel 303 is the lower left pixel in the range 305. In addition, the positional coordinates (x,y) of a pixel of which the closest representative point number is N=147 are within the range of 225≤x<340 and 225≤y<340. Thus, the lower right coordinates of the range 305 are (339,339), and the pixel 304 is the lower right pixel in the range 305.

In this manner, the range 305 in which pixels to which the region label L=98 can be assigned are present is the range of from 0 to +255 in the x- and y-directions with the origin lying at the pixel 301. Therefore, when the positional coordinates of the pixels to which the region label L=98 can be assigned are converted to the coordinate system of which the origin lies at the pixel 301, the coordinate values therein can be expressed with an 8-bit data width.

In the present exemplary embodiment, the coordinate converting unit 105 determines the origin of the coordinate system unique to each of the small regions on the basis of the constraint condition in the segmentation processing. Specifically, the coordinate converting unit 105 determines, as the coordinate system unique to each of the small regions, a coordinate system in which the origin lies at the pixel with the smallest coordinates (x,y) among the pixels to which an identical region label L can be assigned and carries out the coordinate conversion. Hereinafter, the coordinate conversion processing carried out by the coordinate converting unit 105 will be described in detail.

Figure 6:
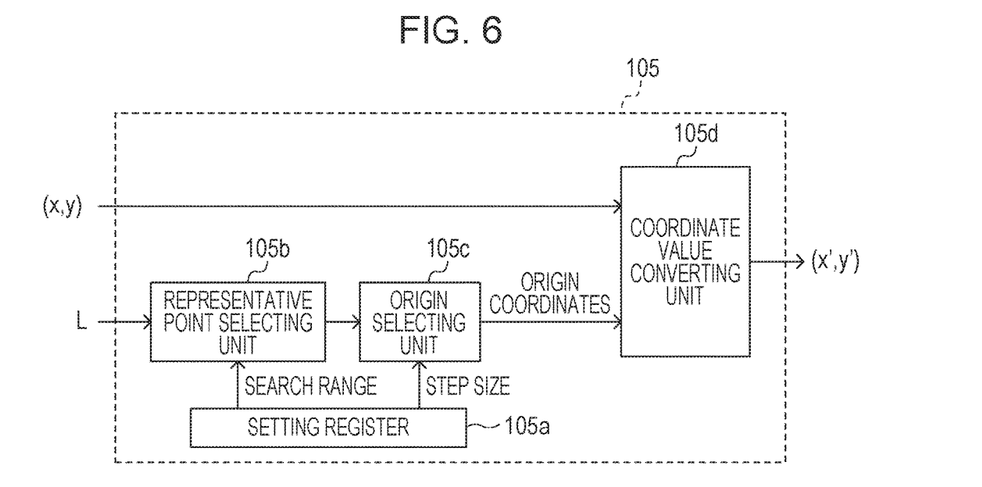
FIG. 6 is a block diagram illustrating an internal configuration of a coordinate converting unit.

FIG. 6 is a block diagram illustrating the internal configuration of the coordinate converting unit 105. The coordinate converting unit 105 includes a setting register 105a, a representative point selecting unit 105b, an origin selecting unit 105c, and a coordinate value converting unit 105d. Each of the units of the coordinate converting unit 105 illustrated in FIG. 6 may operate as dedicated hardware, or the function of each of the units may be implemented as the CPU 101 illustrated in FIG. 1 executes a program. In a case in which at least a portion of the units operates as dedicated hardware, the dedicated hardware operates under the control of the CPU 101.

The setting register 105a stores the search range and the step size, which are the parameters used by the segmentation unit 104 in the segmentation processing. The setting register 105a is referred to by the representative point selecting unit 105b and the origin selecting unit 105c.

The representative point selecting unit 105b selects, from a plurality of representative points located within the search range from the initial coordinates of the representative point with the region label L, a representative point of which the coordinate values are the smallest on the basis of the region label L and the search range information. The representative point selecting unit 105b may calculate the initial coordinates of the representative point by using the expression (4) above or may derive the initial coordinates of the representative point by referring to a table. In a case in which the coordinate converting unit 105 refers to a table, a table that provides the association between a region label L and the initial coordinates of the representative point with that region label L is stored in advance.

The origin selecting unit 105c selects, from the pixels to which the representative point selected by the representative point selecting unit 105b is closest, a pixel having the smallest coordinates as the origin on the basis of the information on the representative point selected by the representative point selecting unit 105b and the step size information. The coordinate value converting unit 105d inputs the coordinates of the origin selected by the origin selecting unit 105c and converts the positional coordinates (x,y) of the pixel of interest to the coordinate values (x',y') from the coordinates of the origin input by the origin selecting unit 105c.

Figure 7:
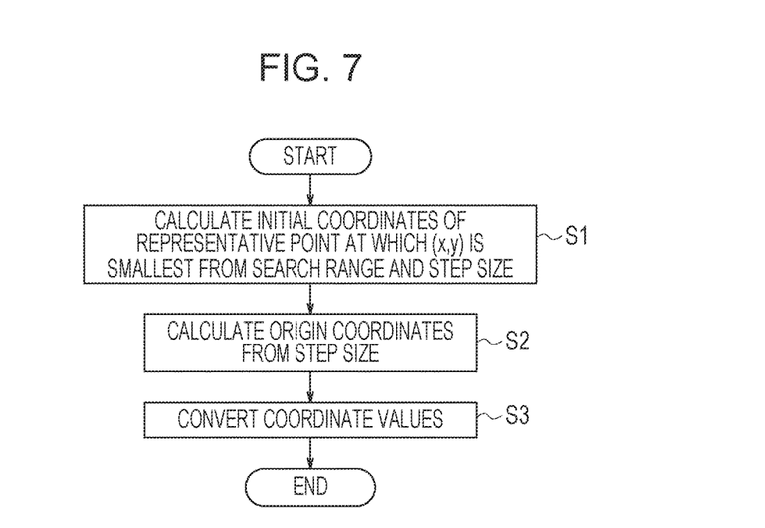
FIG. 7 is a flowchart illustrating a procedure for converting coordinates.

FIG. 7 is a flowchart illustrating the procedure of the coordinate conversion carried out by the coordinate converting unit 105. The processing illustrated in FIG. 7 may be implemented as each of the units illustrated in FIG. 6 operates as a separate piece of hardware or may be implemented as the CPU 101 loads and executes a necessary program. The processing illustrated in FIG. 7 is started upon the coordinate converting unit 105 receiving the pixel data (R,G,B,x,y) from the DMAC 103 and the region label L from the segmentation unit 104. Hereinafter, the alphabet S means a step in the flowchart.

First, in S1, the representative point selecting unit 105b calculates the initial coordinates (Xini(L),Yini(L)) of the representative point with the region label L. Here, the representative point selecting unit 105b may derive the initial coordinates by referring to a table on the basis of the region label L or may calculate the initial coordinates on the basis of the step size through the expression described above. Next, the representative point selecting unit 105b selects, from the representative points present within the search range from the derived initial coordinates of the representative point, a representative point with the smallest coordinate values and calculates the initial coordinates of the selected representative point.

For example, when the region label L=98 has been input from the segmentation unit 104, the representative point selecting unit 105b calculates the initial coordinates as in (Xini(98),Yini(98))=(212,212). In addition, since the search range is one step size, the representative point selecting unit 105b selects, from the representative points located within the search range, the representative point with the region label L=49 as the representative point having the smallest coordinate values. Then, the representative point selecting unit 105b calculates the initial coordinates of the representative point with the region label L=49 as in (Xini(49),Yini(49))=(127,127).

Next, in S2, the origin selecting unit 105c calculates the smallest coordinate values among the pixels to which the initial coordinates of the representative point calculated in S1 are closest. Specifically, the origin selecting unit 105c calculates the coordinates obtained by subtracting a half of the step size in the X-direction and the Y-direction, respectively, from the initial coordinates (Xini(L),Yini(L)) of the representative point calculated in S1 and sets the calculated coordinates as the coordinates of the origin. In other words, the coordinates of the origin are calculated as in (Xorg(L),Yorg(L))=(Xini(L)−step size/2,Yini(L)−step size/2). Here, if the coordinates of the origin become negative, the coordinates are corrected to 0. In this manner, a new coordinate system is determined.

As described above, when the region label L=98 has been input from the segmentation unit 104, the initial coordinates of the representative point calculated in S1 are (127,127). Since the step size is 85 pixels, the origin selecting unit 105c calculates the coordinates of the origin as in (127−85/2,127−85/2)=(85,85).

Lastly, in S3, the coordinate value converting unit 105d converts the positional coordinates (x,y) of the pixel of interest to the coordinate values on the coordinate system determined in S2. Specifically, the positional coordinates (x,y) are converted to the coordinate values (x',y') from the coordinates of the origin by subtracting the coordinates of the origin (Xorg(L),Yorg(L)) calculated in S2 from the positional coordinates (x,y) of the pixel of interest. In other words, x'=x−Xorg(L), and y'=y−Yorg(L).

As described thus far, the coordinate converting unit 105 selects, from the representative points located within the search range from the initial coordinates of the representative point with the region label L, a representative point having the smallest coordinate values and identifies the smallest coordinates among the pixels to which the initial coordinates of the selected representative point are the closest. Then, the coordinate converting unit 105 determines the identified coordinates as the origin of the coordinate system of the small region. In this manner, the coordinate converting unit 105 determines the coordinate system unique to each of the divided small regions and converts the positional coordinates of each of the pixels in the image to be processed to the coordinate values on the coordinate system corresponding to the small region to which the pixel belongs.

Referring back to FIG. 1, the cache memory 106 temporarily stores (retains) the data in the main memory 102. In addition, the cache memory 106 stores (retains) feature amount data (cumulative operation value) of a small region calculated by the feature amount calculating unit 107 in the processing of one block, which will be described later. Prior to starting the processing, the cache memory 106 is notified by the CPU 101 of the region label L of a small region of which the feature amount data is calculated and copies the feature amount data of the corresponding region label L, among the feature amount data stored in the main memory 102, into an internal memory.

The size of the cache memory 106 is the size capable of storing the feature amount data corresponding to the total of 25 region labels L of the representative points within one block and the representative points surrounding the stated one block and is 32 bytes 25=800 bytes in the present exemplary embodiment. In the cache memory 106, the feature amount data corresponding to the smallest region label L is stored at address 0, and 25 pieces of feature amount data are stored at every 32 bytes in ascending order.

Upon the region label L being passed from the feature amount calculating unit 107, the cache memory 106 reads or writes the feature amount data of the corresponding region label L. When the received region label L is the region label L that is not stored in the cache memory 106, the cache memory 106 reads or writes the feature amount data from or into the main memory 102. Upon the feature amount calculating unit 107 having finished the processing on one block, the cache memory 106 writes the entire feature amount data stored therein back into the main memory 102.

Figure 8:
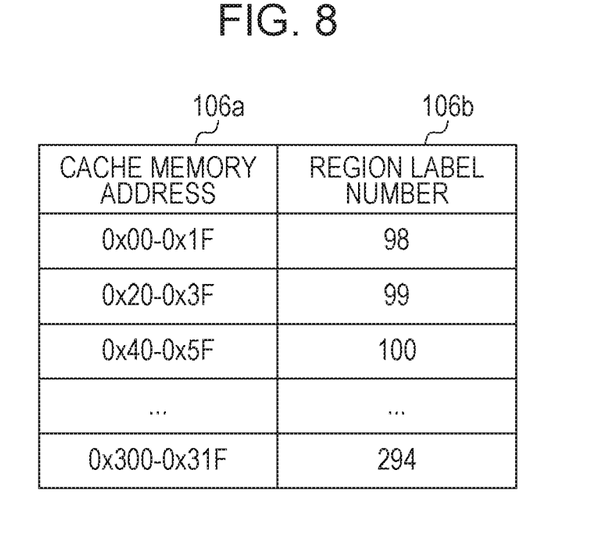
FIG. 8 is a table for associating a region label with a cache memory address.

The cache memory 106 stores therein a table that provides the association between the address in the cache memory 106 and the region label L corresponding to the stored feature amount data. The table is illustrated in FIG. 8. In FIG. 8, information in a field 106a is the address in the cache memory 106, and information in a field 106b is the region label L corresponding to the stored feature amount data. FIG. 8 illustrates an example in which the feature amount data corresponding to the region labels L of the representative points within the block 204 illustrated in FIG. 3 and the representative points surrounding the block 204 (25 representative points within the range 213) is stored. The address in the main memory 102 can be obtained by adding 32*L to the base address in the main memory 102.

The feature amount calculating unit 107 illustrated in FIG. 1 carries out the cumulative operation on a pixel by pixel basis with the converted pixel data (R,G,B,x',y') output from the coordinate converting unit 105 serving as an input and calculates the feature amount data. Here, the feature amount calculating unit 107 carries out the cumulative operation by using the converted coordinate values of a plurality of pixels to which an identical region label L has been assigned and calculates the feature amount data corresponding to that region label L. The feature amount calculating unit 107 may be configured to operate as dedicated hardware, or the function of the feature amount calculating unit 107 may be implemented as the CPU 101 executes a program.

As described above, the feature amount calculating unit 107 calculates, as the region feature amount, the geometric feature amount including the area of a small region (0th order moment), the center of gravity of a small region (1st order moment), and the dispersion of a small region (2nd order moment), in addition to the image quality feature amount, such as the color average of R, G, and B. The feature amount calculating unit 107 calculates the feature amount data (cumulative operation value) indicated below for the 1st order moment and the 2nd order moment.

1st order moment $$\sum_{i=1}^{n} x(i), \sum_{i=1}^{n} y(i) \quad (6)$$

first term of 2nd order moment $$\sum_{i=1}^{n} x(i)^2, \sum_{i=1}^{n} y(i)^2 \quad (7)$$

Figure 9:
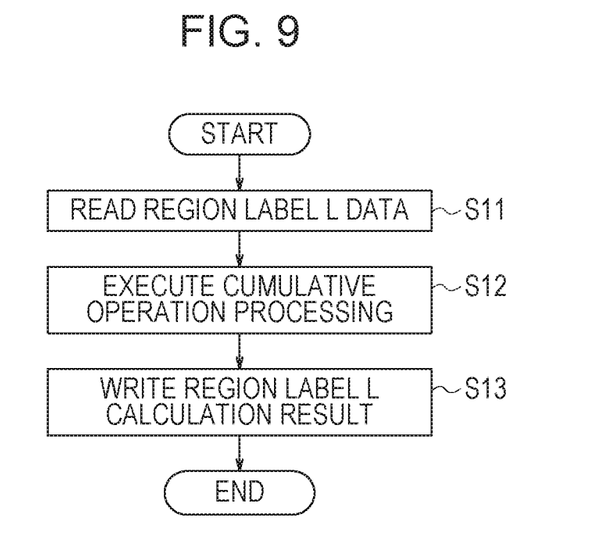
FIG. 9 is a flowchart illustrating a procedure for calculating a feature amount.

FIG. 9 is a flowchart illustrating the procedure of feature amount calculation carried out by the feature amount calculating unit 107. The processing illustrated in FIG. 9 may be implemented as the feature amount calculating unit 107 operates as dedicated hardware or may be implemented as the CPU 101 loads and executes a necessary program. The processing in FIG. 9 is started upon the feature amount calculating unit 107 receiving the pixel data (R,G,B,x',y') and the region label L from the coordinate converting unit 105. First, in S11, the feature amount calculating unit 107 passes the region label L to the cache memory 106 and reads the feature amount data (cumulative operation value) RData from the cache memory 106.

Next, in S12, the feature amount calculating unit 107 carries out the cumulative operation processing by using the pixel data (R,G,B,x',y'). Specifically, the feature amount calculating unit 107 calculates the 0th order moment by adding 1 to the data at address 0 in the read data (data at address 0x00=+1). In addition, the feature amount calculating unit 107 calculates the 1st order moment by adding x' to the data at address 4 and y' to the data at address 8 (data at address 0x04=+x', data at address 0x08=+y').

Furthermore, the feature amount calculating unit 107 calculates the 2nd order moment by adding $x'^2$ to the data at address c and $y'^2$ to the date at address 10 (data at address 0x0c=+$x'^2$, data at address 0x10=+$y'^2$). In addition, the feature amount calculating unit 107 calculates the color average by adding R to the data at address 14, G to the data at address 18, and B to the data at address 1c (data at address 0x14=+R, data at address 0x18=+G, data address 0x1c=+B).

Lastly, in S13, the feature amount calculating unit 107 passes and writes the region label L and the feature amount data (cumulative operation value) WData cumulatively calculated in S12 to and into the cache memory 106.

Hereinafter, the operation of the image processing apparatus 100 according to the present exemplary embodiment will be described in concrete terms. Here, a case in which the image processing apparatus 100 processes the blocks 201, 202, 203, and 204 illustrated in FIG. 3 in this order will be described.

First, the image processing apparatus 100 processes the block 201. In this case, the CPU 101 notifies the DMAC 103 and the cache memory 106 of the region labels L=0-3, 48-51, 96-99, and 144-147, as the information on the total of 16 representative points in the block 201 to be processed and surrounding the block 201.

Then, the cache memory 106 updates the field 106b of the table illustrated in FIG. 8 on the basis of the notified region labels L. In other words, the information on the aforementioned 16 region labels L is stored in the field 106b. In addition, the DMAC 103 acquires the parameter necessary for the segmentation processing and the information on the aforementioned 16 representative points from the main memory 102 and transfers these pieces of information to the segmentation unit 104. The segmentation unit 104 carries out the segmentation processing on the basis of the information received from the DMAC 103 and assigns the region label L of any one of the aforementioned 16 representative points to each of the pixels in the block 201.

The coordinate converting unit 105 determines the coordinates of the origin on the coordinate system unique to each of the small regions for the region label L that has been assigned to each of the pixels in accordance with the processing flow illustrated in FIG. 7. Then, the coordinate converting unit 105 converts the coordinate values (x,y) of each of the pixels in the block 201 to the coordinate values (x',y') on the coordinate system corresponding to the small region to which each pixel belongs. With regard to the region labels L that can be assigned to each of the pixels within the block 201 by the coordinate converting unit 105, the result of calculating the coordinates of the origin is indicated in Table 1.

TABLE 1

| Region Label | Coordinates of Origin |
| --- | --- |
| 0 | (0, 0) |
| 1 | (0, 0) |
| 2 | (85, 0) |
| 3 | (170, 0) |
| 48 | (0, 0) |
| 49 | (0, 0) |
| 50 | (85, 0) |
| 51 | (170, 0) |

TABLE 1-continued

| Region Label | Coordinates of Origin |
|---|---|
| 96 | (0, 85) |
| 97 | (0, 85) |
| 98 | (85, 85) |
| 99 | (170, 85) |
| 144 | (0, 170) |
| 145 | (0, 170) |
| 146 | (85, 170) |
| 147 | (170, 170) |

The feature amount calculating unit 107 calculates the feature amount data (cumulative operation value) of the corresponding region label L by using the coordinate values (R,G,B,x',y') converted by the coordinate converting unit 105 and passes the region label L and the calculated feature amount data to the cache memory 106. With this operation, the feature amount data of the region label L is stored at a corresponding address in the cache memory 106. The feature amount calculating unit 107 calculates the feature amount data of all of the region labels L that have been assigned to the pixels in the block 201 and stores the feature amount data into the cache memory 106. Upon the processing on the block 201 having been finished, the cache memory 106 copies the feature amount data stored at the addresses in the field 106a of the table illustrated in FIG. 8 to the corresponding addresses in the main memory 102. With this operation, the feature amount data of the region labels L=0-3, 48-51, 96-99, and 144-147 is updated within an area of the main memory 102 in which the feature amount data is stored for each of the small regions.

Subsequently, the image processing apparatus 100 processes the block 202. In this case, the CPU 101 notifies the DMAC 103 and the cache memory 106 of the region labels L=2-6, 50-54, 98-102, and 146-150, as the information on the total of 20 representative points in the block 202 to be processed and surrounding the block 202.

Then, the cache memory 106 updates the field 106b of the table illustrated in FIG. 8 on the basis of the notified region labels L and copies therein the feature amount data corresponding to the notified region labels L, among the feature amount data stored in the main memory 102. At this point, the cache memory 106 reads out from the main memory 102 the feature amount data of the region labels L=2, 3, 50, 51, 98, 99, 146, and 147 that have been copied in the processing on the block 201. In this processing on the block 202, the calculation result of the feature amount data in the block 202 is added to the calculation result of the feature amount data in the block 201.

In addition, the DMAC 103 acquires the parameter necessary for the segmentation processing and the information on the aforementioned 20 representative points from the main memory 102 and transfers these pieces of information to the segmentation unit 104. The segmentation unit 104 carries out the segmentation processing on the basis of the information received from the DMAC 103 and assigns the region labels L of any one of the aforementioned 20 representative points to each of the pixels in the block 202. The coordinate converting unit 105 determines the coordinates of the origin on the coordinate system unique to each of the small regions for the region label L that has been assigned to each of the pixels in accordance with the processing flow illustrated in FIG. 7. Then, the coordinate converting unit 105 converts the coordinate values (x,y) of each of the pixels in the block 202 to the coordinate values (x',y') on the coordinate system corresponding to the small region to which each pixel belongs. With regard to the region labels L that can be assigned to each of the pixels within the block 202 by the coordinate converting unit 105, the result of calculating the coordinates of the origin is indicated in Table 2.

TABLE 2

| Region Label | Coordinates of Origin |
|---|---|
| 2* | (85, 0) |
| 3* | (170, 0) |
| 4 | (255, 0) |
| 5 | (340, 0) |
| 6 | (425, 0) |
| 50* | (85, 0) |
| 51* | (170, 0) |
| 52 | (255, 0) |
| 53 | (340, 0) |
| 54 | (425, 0) |
| 98* | (85, 85) |
| 99* | (170, 85) |
| 100 | (255, 85) |
| 101 | (340, 85) |
| 102 | (425, 85) |
| 146* | (85, 170) |
| 147* | (170, 170) |
| 148 | (255, 170) |
| 149 | (340, 170) |
| 150 | (425, 170) |

The feature amount calculating unit 107 calculates the feature amount data (cumulative operation value) of the corresponding region label L by using the coordinate values (R,G,B,x',y') converted by the coordinate converting unit 105 and passes the region label L and the calculated feature amount data to the cache memory 106. At this point, the feature amount data is read out from the cache memory 106 for the region labels L=2, 3, 50, 51, 98, 99, 146, and 147, and the cumulative operation is carried out on the read-out data. With this operation, the feature amount data of the region labels L stored in the cache memory 106 is updated. The feature amount calculating unit 107 calculates the feature amount data of all of the region labels L that have been assigned to the pixels in the block 201 and stores the feature amount data into the cache memory 106.

In this manner, for the region labels L=2, 3, 50, 51, 98, 99, 146, and 147, the calculation result of the feature amount data in the block 202 is added to the calculation result of the feature amount data in the block 201. In the present exemplary embodiment, the coordinate converting unit 105 determines the coordinate system unique to each of the small regions, and thus the coordinates of the origin can be determined uniquely independent of the block. Therefore, the geometric feature amount of the region label L assigned across a plurality of blocks, such as the region label L=51 assigned to both the block 201 and the block 202, can be calculated by using the coordinate values from the coordinates of the same origin. Thus, the calculation results of different blocks can be added together without performing complicated processing of standardizing the coordinate system or the like.

Upon the processing on the block 202 having been finished, the cache memory 106 copies the feature amount data stored at the addresses in the field 106a of the table illustrated in FIG. 8 to the corresponding addresses in the main memory 102. With this operation, the feature amount data of the region labels L=2-6, 50-54, 98-102, and 146-150 is updated within an area of the main memory 102 in which the feature amount data is stored for the respective small regions. The image processing apparatus 100 carries out similar processing on the blocks 203 and 204 as well.

Then, upon the processing on all of the blocks in the image having been finished, the image processing apparatus 100 processes the feature amount data (cumulative operation value) calculated for each of the small regions and calculates the final feature amount data for each of the small regions. In other words, the image processing apparatus 100 calculates the geometric feature amount indicated in the expression (2) and the expression (3) above by using the cumulative operation value that has been calculated in the end for each of the small regions indicated in the expression (6) and the expression (7) above and the number n of the pixels constituting each of the small regions. Here, with regard to the 1st order moment that indicates the center of gravity of the small region, processing of correcting an amount corresponding to an offset of the coordinates of the origin associated with the coordinate conversion needs to be carried out. Specifically, when the coordinates of the origin are (Xs,Ys), the correction of adding the coordinate values Xs and Xy, respectively, is needed.

$$Xs + \frac{1}{n}\sum_{i=1}^{n} x(i), Ys + \frac{1}{n}\sum_{i=1}^{n} y(i) \qquad (8)$$

As described thus far, the image processing apparatus 100 carries out the segmentation processing of dividing an image into a plurality of small local regions under a predetermined constraint condition. In this case, the image processing apparatus 100 determines the coordinate system unique to each of the divided small regions and converts the coordinate values of each of the pixels in the image to the coordinate values on the coordinate system corresponding to the small region to which each of the pixels belongs. Then, the image processing apparatus 100 calculates the feature amount of the small region by using the converted coordinate values. In addition, the image processing apparatus 100 includes a memory (the main memory 102 or the cache memory 106) for retaining the calculated feature amount.

In this manner, the image processing apparatus 100 determines the coordinate system unique to each of the small regions by utilizing a feature that the clustered small region has a locality, and thus the coordinate values of each pixel can be converted to the coordinate values of a compact and local coordinate system. Therefore, the image processing apparatus 100 can calculate the feature amount of the small region with a compact bit number, and the amount of data (the number of digits) of the calculation result of the feature amount can be reduced.

The positional coordinates of a pixel increase as the distance from the origin of the image to the pixel increases. Therefore, when the feature amount is the data that uses the positional coordinates of a pixel, the amount of data (the number of digits) increases as the size of the image to be processed increases. For example, the coordinate values of the pixels in the block 201 illustrated in FIG. 3 are x(i)=0-254 and y(i)=0-254, and x(i) and y(i) are both expressed with an 8-bit data width. On the other hand, the coordinate values of the pixels in the block 205 illustrated in FIG. 3 are x(i)=3824-4079 and y(i)=1784-2039, and x(i) is expressed with a 12-bit data width and y(i) is expressed with an 11-bit data width. Thus, when the feature amount is calculated by using the unconverted positional coordinates of the pixel, the amount of data (the number of digits) of the calculation result of the feature amount increases as the size of the image to be processed increases. As a result, the size of the memory for storing the feature amount needs to be increased.

In contrast, in the present exemplary embodiment, the amount of data (the number of digits) of the calculation result of the feature amount can be reduced independent of the increase in the size of the image to be processed, and thus the size of the memory for retaining (storing) the feature amount can be kept small.

In addition, the image processing apparatus 100 divides an image into a plurality of blocks and carries out the processing on a block by block basis. When blocks to be processed are switched, the image processing apparatus 100 writes the feature amount data of the processed block back into the main memory 102 and reads out the feature amount data necessary for the next block to be processed from the main memory 102. The access to the main memory 102 suffers from latency for a period from when the data is requested to when the data arrives. When the amount of data to be written back and read out is large, the access to the main memory 102 becomes a bottleneck, which leads to a problem in that the calculation performance of the feature amount data does not improve. Furthermore, the bandwidth of the main memory 102 is consumed (oppressed), which leads to another problem in that the performance of the image processing apparatus 100 as a whole does not improve. These problems may occur more prominently when the amount of data to be read out from and written into the main memory 102 increases as the image size increases.

In contrast, in the present exemplary embodiment, the amount of data (the number of digits) of the calculation result of the feature amount can be reduced independent of the increase in the size of the image to be processed, and thus the time it takes to read out and write data from and into the memory can be reduced. As a result, the processing performance of the image processing apparatus 100 can be improved.

Furthermore, the image processing apparatus 100 determines the coordinate system unique to each of the divided small regions, and thus the coordinate system can be determined uniquely for each of the small regions. Therefore, even in a case in which a small region is present across a plurality of blocks, the feature amount of the small region present across the plurality of blocks can be calculated by using the result obtained by adding together the feature amount data as-is of the small regions calculated in the processing of the different blocks.

In order to reduce the amount of the feature amount data, it is contemplated that the image is divided into a plurality of blocks and the coordinate system is set on a block by block basis. In this case, however, when the clustered small region is present across a plurality of blocks, processing of individually storing the feature amount data calculated in different coordinate systems and adding together the feature amount data in the standardized coordinate system in the end is necessary. In this manner, the cost for storing the feature amount data and the cost for additional calculation arise.

In contrast, in the present exemplary embodiment, additional processing cost such as those described above can be suppressed. When the feature amount is calculated by using a local coordinate system unique to each of the small regions, the calculation value needs to be corrected by an amount corresponding to an offset in the local coordinate system for the 1st order moment that indicates the center of gravity of the region, as indicated in the expression (8) above, but the additional cost of this processing is sufficiently small.

In addition, the image processing apparatus 100 determines the origin of the coordinate system on the basis of the constraint condition of the segmentation processing at the time of the coordinate conversion processing. Therefore, the image processing apparatus 100 can convert the positional coordinates of each pixel to the offset coordinates from the coordinates of the origin corresponding to the small region obtained through the segmentation processing and calculate the feature amount of each of the small regions.

As the segmentation processing, the image processing apparatus 100 carries out the processing of clustering each of the pixels to any one of the plurality of representative points representing respective small regions disposed on the image. The constraint condition used by the image processing apparatus 100 to determine the origin includes the step size that indicates the interval of the representative points and the search range in which the representative points to which the pixels are clustered are searched for. In other words, the image processing apparatus 100 can determine the origin in consideration of the positional coordinates of a given pixel that can belong to a small region through the segmentation processing. Therefore, the image processing apparatus 100 can determine the coordinate system unique to each small region easily and appropriately.

In addition, the image processing apparatus 100 carries out the segmentation processing with limiting the coordinate space in which the pixels are clustered to a specific representative point to a predetermined range. Thus, the size of the small region can be limited, and the coordinate system unique to each small region can be made compact.

Furthermore, the image processing apparatus 100 determines a pixel having the smallest coordinate values, among a plurality of pixels that can belong to an identical small region through the segmentation processing, as the origin of the coordinate system corresponding to that small region. When the step size is 85 pixels and the search range is one step size as in the present exemplary embodiment, the pixels that can belong to one small region are located within a range of from 0 to +255 in each of the x- and y-directions from the origin. Therefore, by determining the coordinates of the origin to the smallest coordinates as described above, the image processing apparatus 100 can convert the coordinates of each pixel with ease. In the case of the example described above, by converting the coordinate values of each pixel to the offset coordinates from the origin, the coordinate values of each pixel can be expressed with an 8-bit data width.

In this manner, the image processing apparatus 100 converts the coordinate values of a pixel that belongs to a small region clustered through the segmentation processing with limiting the coordinate space in which pixels are clustered to a specific representative point to a predetermined range to the coordinate values on the coordinate system in which the origin lies at the smallest coordinates within the predetermined range. Therefore, the data width of the geometric feature amount, which is the feature amount that uses the positional coordinates of the pixel, can be made constant independent of the image size.

In other words, the image processing apparatus 100 can set such that the data width of the calculation result of the feature amount of each small region becomes a predetermined width in accordance with the constraint condition of the segmentation processing. The constraint condition for determining the data width of the feature amount is the search range in which the representative point to which a pixel is clustered is searched for. As the search range is larger, the range of pixels that can belong to one small region is broader, and thus the data width obtained when the coordinate values of each pixel are expressed by the coordinate values on the coordinate system unique to the small region becomes greater as well. In the image processing apparatus 100, the constraint condition in the segmentation processing is determined such that the data width of the feature amount becomes a predetermined width (in the present exemplary embodiment, the data width of the 0th order moment is 8 bits, the data width of the 1st order moment is 24 bits, and the data width of the 2nd order moment is 32 bits).

In addition, the image processing apparatus 100 calculates the geometric feature amount that indicates the geometric feature of the image. The geometric feature amount includes information that indicates the area and the center of gravity of a region and the dispersion from the center of gravity. In this manner, the image processing apparatus 100 can appropriately carry out the region recognition by calculating the geometric feature amount as the feature amount.

As described thus far, the image processing apparatus 100 according to the present exemplary embodiment can suppress an increase in the memory size and the amount of data of the geometric feature amount associated with an increase in the image size while keeping the additional calculation cost small. Therefore, the image processing apparatus 100 can reduce the time it takes to read out data from the main memory 102, which arises when calculating the geometric feature amount, and can improve the processing performance of the apparatus as a whole.

Modifications

In the exemplary embodiment above, a case in which the image processing apparatus 100 includes the cache memory 106 has been described, but the image processing apparatus 100 does not have to include the cache memory 106. In this case, although the cumulative operation result is read out from and written into the main memory 102, the time it takes to read out data from the main memory 102 can be reduced by reducing the number of digits of the cumulative sum as described above, and an effect similar to that of the exemplary embodiment described above can be obtained.

In addition, although a case in which an image is divided into blocks and the processing is carried out on a block by block basis has been described in the exemplary embodiment above, an image does not have to be divided into blocks. In this case as well, the number of digits of the cumulative sum can be reduced, and an effect similar to that of the exemplary embodiment described above can be obtained.

Furthermore, although the image processing apparatus 100 constituted by hardware has been described in the exemplary embodiment above, even in a case in which all of the functions of the image processing apparatus 100 are implemented through software processing carried out by a CPU or the like, a similar effect can be obtained.

In addition, although the coordinates of the origin in the coordinate system unique to each small region are the smallest coordinates among the coordinates of a plurality of pixels to which the region label L can be assigned in the exemplary embodiment above, it suffices that the coordinate system unique to each small region can be determined, and the method of determining the origin is not limited to the method described above.

Furthermore, a case in which the image processing apparatus 100 calculates, as the feature amount, the RGB color average, the 0th order moment, the 1st order moment on the x-coordinate, the 1st order moment on the y-coordinate, the 2nd order moment on the x-coordinate, and the 2nd order moment on the y-coordinate has been described in the exemplary embodiment above. However, the feature amount to be calculated by the image processing apparatus 100 is not limited to those described above. For example, the color dispersion may be calculated as the image quality feature amount, or an XY moment may be calculated as the geometric feature amount.

In addition, although a case in which the image processing apparatus 100 carries out the segmentation processing that uses the SLIC technique has been described in the exemplary embodiment above, the technique in the segmentation processing is not limited to the one described above. For example, techniques such as k-means clustering can also be used.

According to the exemplary embodiments described thus far, the amount of data of the result of calculating the feature amount that uses the positional coordinates of pixels for carrying out the region recognition or the like of an image can be reduced.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-069151 filed Mar. 30, 2016, which is hereby incorporated by reference herein in its entirety.

What is claimed is:

1. An image processing apparatus, comprising:
at least one processor; and
a memory coupled to the at least one processor, the memory having instructions that, when executed by the processor, perform operations as:
a dividing unit configured to divide an image into a plurality of regions based on an attribute of a pixel under a predetermined constraint condition, the image having an image coordinate system set therein;
a setting unit configured to set a region coordinate system for each of the regions obtained by the dividing unit based on the predetermined constraint condition;
a converting unit configured to convert coordinate values of a pixel in the image on the image coordinate system into coordinate values on the region coordinate system set for a region to which the pixel belongs; and
a calculating unit configured to calculate a feature amount of the region by using the converted coordinate values.

2. The image processing apparatus according to claim 1, wherein the dividing unit divides the image by clustering a pixel in the image to any one of a plurality of representative points disposed on the image.

3. The image processing apparatus according to claim 2, wherein the constraint condition includes a step size that indicates an interval of the representative points.

4. The image processing apparatus according to claim 2, wherein the constraint condition includes a search range that indicates a range in which the representative point to which a pixel is clustered is searched for.

5. The image processing apparatus according to claim 1, wherein the constraint condition is determined such that a data width of the calculated feature amount becomes a predetermined width.

6. The image processing apparatus according to claim 1, wherein the converting unit determines a pixel having smallest coordinate values among a plurality of pixels that can be grouped to a given region among the divided regions as an origin of a coordinate system corresponding to the given region.

7. The image processing apparatus according to claim 1, wherein the calculating unit calculates, as the feature amount, a geometric feature amount that indicates a geometric feature of the image.

8. The image processing apparatus according to claim 1, further comprising:
a storing unit configured to store the calculated feature amount.

9. An image processing method, comprising:
dividing an image into a plurality of regions based on an attribute of a pixel under a predetermined constraint condition, the image having an image coordinate system set therein;
setting a region coordinate system for each of the divided regions based on the predetermined constraint condition;
converting coordinate values of a pixel in the image on the image coordinate system into coordinate values on the region coordinate system set for a region to which the pixel belongs; and
calculating a feature amount of the region by using the converted coordinate values.

10. The method according to claim 9, wherein the converting determines a pixel having smallest coordinate values among a plurality of pixels that can be grouped to a given region among the divided regions as an origin of a coordinate system corresponding to the given region.

11. The method according to claim 9,
wherein the calculating calculates, as the feature amount, a geometric feature amount that indicates a geometric feature of the image.

12. The method according to claim 9, further comprising: storing the calculated feature amount in a storing unit.

13. A non-transitory computer-readable storage medium storing a program that causes a computer to function as:
a dividing unit configured to divide an image into a plurality of regions based on an attribute of a pixel under a predetermined constraint condition, the image having an image coordinate system set therein;
a setting unit configured to set a region coordinate system for each of the regions obtained by the dividing unit based on the predetermined constraint condition;
a converting unit configured to convert coordinate values of a pixel in the image on the image coordinate system into coordinate values on the region coordinate system set for a region to which the pixel belongs; and
a calculating unit configured to calculate a feature amount of the region by using the converted coordinate values.

14. The non-transitory computer-readable storage medium according to claim 13,
wherein the converting unit determines a pixel having smallest coordinate values among a plurality of pixels that can be grouped to a given region among the divided regions as an origin of a coordinate system corresponding to the given region.

15. The non-transitory computer-readable storage medium according to claim 13,
wherein the calculating unit calculates, as the feature amount, a geometric feature amount that indicates a geometric feature of the image.

16. The non-transitory computer-readable storage medium according to claim 13, further comprising:
a storing unit configured to store the calculated feature amount calculated by the calculating unit.

17. An image processing apparatus, comprising:
at least one processor; and
a memory coupled to the at least one processor, the memory having instructions that, when executed by the processor, perform operations as:
a dividing unit configured to divide an image into a plurality of regions, the image having an image coordinate system set therein;
a setting unit configured to set a region coordinate system for each of the regions obtained by the dividing unit;
a converting unit configured to convert coordinate values of a pixel in the image on the image coordinate system into coordinate values on the region coordinate system set for a region to which the pixel belongs; and
an image processing unit configured to perform image processing on the region by using the converted coordinate values.

18. The image processing apparatus according to claim 17,
wherein the dividing unit divides the image by clustering a pixel in the image to any one of a plurality of representative points disposed on the image.

19. The image processing apparatus according to claim 17,
wherein the converting unit determines a pixel having smallest coordinate values among a plurality of pixels that can be grouped to a given region among the divided regions as an origin of a coordinate system corresponding to the given region.

20. An image processing method, comprising:
dividing an image into a plurality of regions, the image having an image coordinate system set therein;
setting a region coordinate system for each of the divided regions;
converting coordinate values of a pixel in the image on the image coordinate system into coordinate values on the region coordinate system set for a region to which the pixel belongs; and
performing image processing on the region by using the converted coordinate values.

21. A non-transitory computer-readable storage medium storing a program that causes a computer to function as:
a dividing unit configured to divide an image into a plurality of regions, the image having an image coordinate system set therein;
a setting unit configured to set a region coordinate system for each of the regions obtained by the dividing unit;
a converting unit configured to convert coordinate values of a pixel in the image on the image coordinate system into coordinate values on the region coordinate system set for a region to which the pixel belongs; and
an image processing unit configured to perform image processing on the region by using the converted coordinate values.

* * * * *